Aug. 9, 1938.  J. A. STURM  2,125,965
COOKING DEVICE
Filed Sept. 20, 1937    2 Sheets-Sheet 1
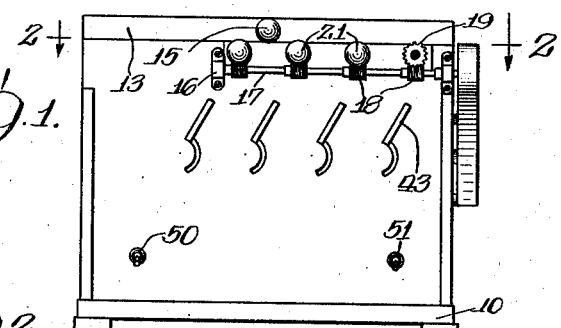
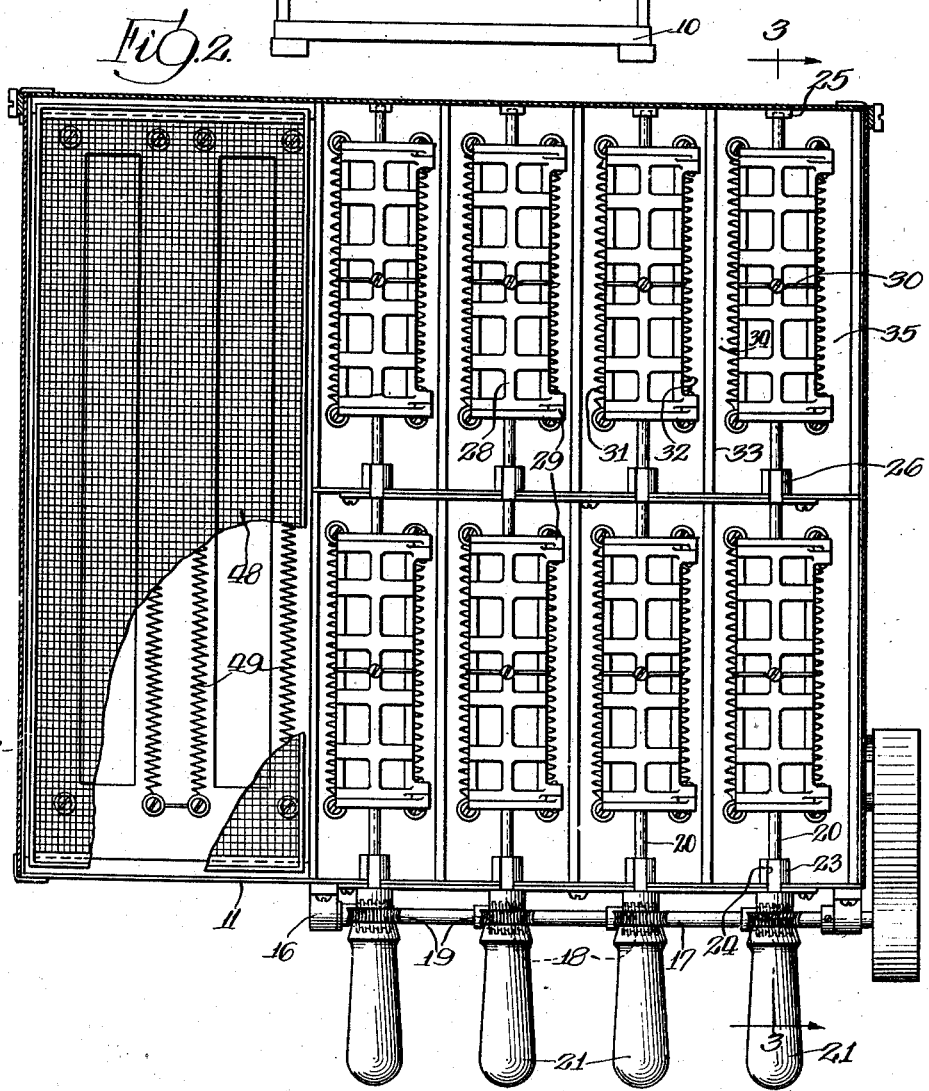
Inventor:
John A. Sturm
By Murray & Murray, Attys Aug. 9, 1938.  J. A. STURM  2,125,965
COOKING DEVICE
Filed Sept. 20, 1937  2 Sheets-Sheet 2
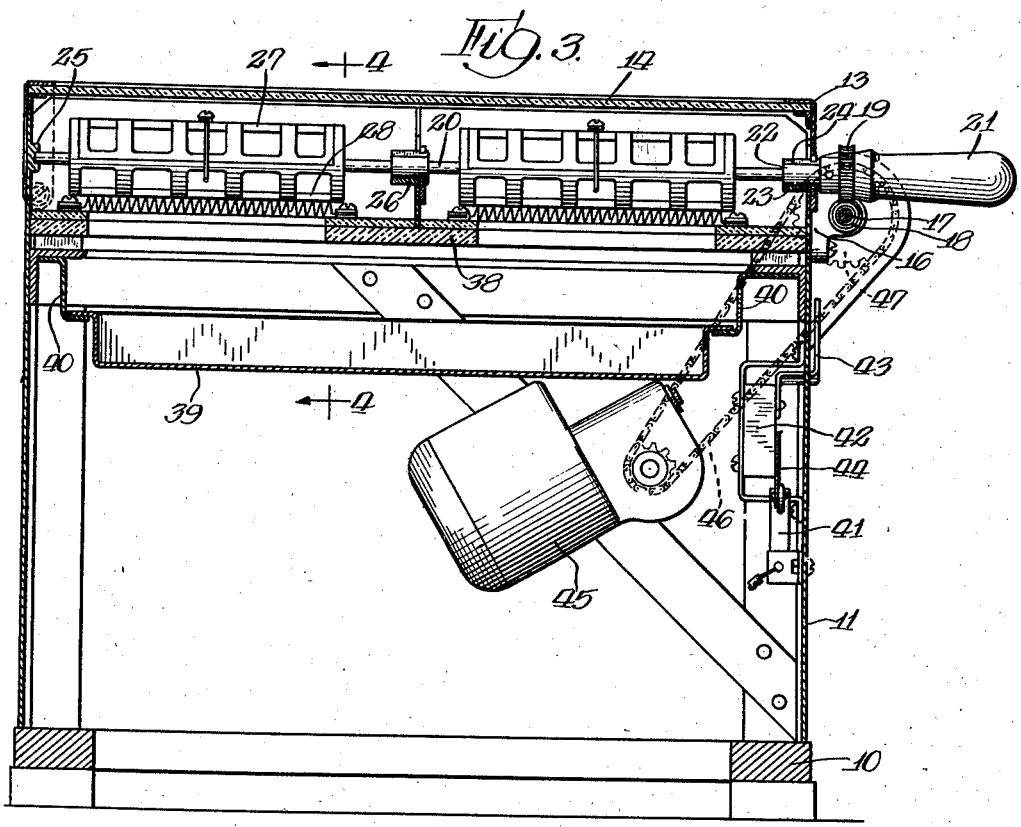
Inventor:
John A. Sturm,
By Thwaing + Thwaing Attys.

Patented Aug. 9, 1938

2,125,965

UNITED STATES PATENT OFFICE 2,125,965

COOKING DEVICE

John A. Sturm, Chicago, Ill.

Application September 20, 1937, Serial No. 164,683

5 Claims. (Cl. 219—19)

My invention relates to cookers and particularly to a device that functions to barbecue meat products such as hamburger or wiener sausages.

An object of my invention is to provide apparatus, operating automatically in conjunction with timing means, whereby a meat product may be grilled or broiled through the use of a turning spit, the heat being applied for a predetermined period and then discontinued.

In the design here disclosed attention has been paid to simplicity of construction and convenience in operation, in order that the device may be used to advantage in restaurants, stands, etc., preferably in the view of the customer, to the end that the product may be delivered hot, fully cooked and in attractive form.

An important advantage in the construction here disclosed is in the formation of the respective cooking chambers as separate units, thus enabling very simple removal for cleaning and renewal of heating elements when necessary.

Details of the construction enabling the desired results to be accomplished will be explained in the following description, in which other advantages will appear.

The invention will be more readily understood by reference to the accompanying drawings, in which:

Fig. 1 is a front end view of apparatus constructed in accordance with my invention;

Fig. 2 is a sectional view on the line 2—2 of Fig. 1, the view being greatly enlarged.

Fig. 3 is a sectional view on the line 3—3 of Fig. 2;

Fig. 4 is a sectional view on the line 4—4 of Fig. 3; and,

Fig. 5 is a fragmentary view showing the timing and switch mechanism.

In the drawings I have illustrated a base 10 carrying a casing 11; one side wall 12 of which is vertically and slidably removable. Preferably the casing is provided with a hinged cover 13 having a glass wall 14 therein overlying and rendering visible the spits. A knob 15 serves as a handle for swinging the lid or cover.

Mounted on brackets 16 secured to the casing 11 is a shaft 17 having worms 18 thereon at spaced intervals, the worms engaging worm wheels 19 secured to the spits 20. (While the part 20 is not a true spit, yet inasmuch as it has the function of a spit, it is referred to by that term.) Further, as the spits illustrated are duplicates in every respect, but one thereof will be described.

At its outer end, the spit 20 has a handle 21 and at the junction of the handle with the part 20 there is an enlargement 22 that fits within a cylindrical bearing member 23 and rotates therein. At its upper end the bearing member is open or slitted as at 24, the slit being slightly wider than the diameter of the part 20. Thus, in order to remove the spit from its position as shown in the drawings, it is only necessary to grasp the handle and pull the spit rearwardly until the enlarged part 22 is free from the bearing, whereupon the shaft 20 may be lifted out through the slit in the bearing. Supporting bearings 25 and 26 are provided at the outer and intermediate portions respectively of the spit. This is desirable, where double or multiple receptacles are provided on each spit.

In the particular embodiment illustrated herein, I provide cages or skeleton cylinders as a part of the spits, these cylinders as best shown in Figs. 2 and 4 comprising two halves 27—28 hinged at 29 and held in closed relation by means of the spring latch 30. This construction is duplicated in all of the examples shown in the drawings. The arrangement is such that when the meat product is to be placed in cooking position, the upper half of the skeleton cylinder is swung backwards. If hamburger is to be cooked, it will be supplied in packed cylindrical form of the size to enable a proper length thereof to be easily dropped into the lower half of the cylinder and the upper half closed thereover.

Cooking heat is applied to the material within the cylinders through two electric heating elements 31—32 located beneath and one at each side of the cylinders. Preferably these heating elements are carried on porcelain units, each consisting of a side wall 33, and a bottom wall 34 having a cut out area 35 immediately beneath and extending substantially the length of the cylinder. The terminals 36 for the heating elements are in the form of pins that frictionally engage thimbles 37 in the dielectric base 38. The latter has a cut out area registering with that in the unit, and immediately beneath the openings I mount a pan 39, endwise slidably supported on brackets 40. The removal of the end wall 12 permits the pan 39 to be slid outward. Preferably water will be kept in the pan and the grease that is driven off from the meat will fall through the openings into the water in the pan. It will be noted that by reason of the construction shown, any one of the units, including the heating elements, may be separately removed for cleaning and replacement of the elements.

The heating elements are supplied with current through a switch 41 as best shown in Fig. 5 that is opened and closed by timing mechanism contained in the box 42, the details of which are unimportant. An arm 43 projecting exteriorly of the casing serves to energize the clock mechanism, the extent to which the arm is depressed from the position shown in the drawings determining the length of time that will elapse before the mechanism opens the switch 41 through the arm 44. In other words, the operator, by throwing the arm 43 closes the switch 41, and the length of time that heat will be supplied will be determined by the extent to which the arm 43 is thrown.

The shaft 17 is rotated by means of a motor 45 acting through speed reducing gearing on the chain 46 and a sprocket 47 fixed to the shaft 17. This motor may be continuously operating or it may be arranged in series with the circuit controlling the heating elements. Preferably, however, it will operate continuously, being controlled by a switch 51.

As a convenience in storing cooked products, I utilize an extension on the casing, the extension having a screen 48 formed as the bottom of a tray, and heating elements 49 are arranged beneath the tray which may be continuously energized to provide a slow heat for keeping the product warm, these heating elements being controlled by a switch 50.

The operation of the device is extremely simple. After throwing backward the cover, any one of the spits may be removed and the meat product quickly placed in the skeleton cylinder. Thereafter the spit is returned to operative position, the cover returned and the respective starting arm 43 thrown downward to the required point. The operator need have no concern thereafter, as the cooking will proceed for the predetermined time, whereupon the heating elements will be de-energized. Removal of the cooked product involves a reversal of the steps of placing it in the cylinder.

The form of the skeleton cylinders will be such as to properly accommodate and admit heat to a desired meat product which may take various shapes. Furthermore, the disposition and number of the spits may be changed, together with the means for rotating the spits. These and other modifications are considered within the spirit of my invention.

I claim:

1. In combination, a support, a plurality of cooking chamber units thereon, a heating element in each unit, said units each comprising a side and bottom wall and being readily removable with the heating element, a spit mounted for rotation in each unit, said spits being likewise readily separable in order to receive and discharge the product to be cooked, and a single motor for rotating all of the spits.

2. In combination, a casing, means providing a plurality of cooking chambers supported in said casing and individual heating elements for each chamber, each of said chambers being separately removable, a separate time switch for each of the heating elements in said chambers for automatically interrupting the supply of heat after a predetermined time, skeleton cylinders removably mounted for rotation in said chambers, and a single motor for rotating said cylinders.

3. In a cooking device, the combination of means providing a chamber, a heating element therein, a shaft having a bearing portion of increased diameter, a skeleton cylinder carried by the shaft and formed in two parts to adapt it to be opened to receive and discharge the product to be cooked, a worm gear on said shaft adjacent to said bearing portion, means providing a bearing having a side opening of a width to permit a shaft to pass through, but of insufficient size to permit the bearing portion to pass, a motor operated worm for engaging the gear to rotate said cylinder, said shaft being readily disengaged from the worm and removed by an axial movement to free the bearing portion from the said bearing.

4. In combination, a casing having a cover, means providing a plurality of cooking chambers in said casing, each chamber having separately controlled heating elements, skeleton cylinders removably mounted within said chambers, said cylinders each having a shaft projecting outside of said casing and carrying a worm gear, a worm for engaging all of the worm gears on said shafts, and a motor for operating said worm, said cylinders and their shafts and worm gears being separately, readily removable from their operative positions.

5. In combination, a casing, means therein providing a plurality of separate chambers in side-by-side relation, a heating element in each chamber and separate control means for each heating element, a shaft carrying a skeleton cylinder mounted within each chamber, said shafts being removably supported in bearings at the ends of said chambers, a common worm shaft extending transversely of all said chambers, a single motor for operating said shaft, said motor being operated independently of the control means for the heating element in said chambers.

JOHN A. STURM.